US008904141B2

(12) United States Patent
Jess et al.

(10) Patent No.: US 8,904,141 B2
(45) Date of Patent: Dec. 2, 2014

(54) MERGING A STORAGE CLUSTER INTO ANOTHER STORAGE CLUSTER

(75) Inventors: Martin Jess, Erie, CO (US); Keith W. Holt, Wichita, KS (US)

(73) Assignee: LSI Corporation, San Jose, CA (US)

( * ) Notice: Subject to any disclaimer, the term of this patent is extended or adjusted under 35 U.S.C. 154(b) by 328 days.

(21) Appl. No.: 13/041,052

(22) Filed: Mar. 4, 2011

(65) Prior Publication Data

US 2012/0226669 A1 Sep. 6, 2012

(51) Int. Cl.
*G06F 12/00* (2006.01)
*G06F 17/30* (2006.01)

(52) U.S. Cl.
CPC .................................... *G06F 17/303* (2013.01)
USPC ...................................................... 711/170

(58) Field of Classification Search
USPC ........... 711/170; 707/205, 610, 150; 709/223, 709/249
See application file for complete search history.

(56) References Cited

U.S. PATENT DOCUMENTS

| 6,067,545 | A  | * | 5/2000  | Wolff ................................... 1/1 |
| 7,269,611 | B2 | * | 9/2007  | Miki .............. 707/610 |
| 7,418,550 | B2 | * | 8/2008  | Hetrick et al. ................ 711/114 |
| 7,818,322 | B2 |   | 10/2010 | Tantrum |
| 8,180,872 | B1 | * | 5/2012  | Marinelli et al. ............. 709/223 |
| 2004/0088437 | A1 | * | 5/2004  | Stimac .......................... 709/249 |
| 2004/0267686 | A1 | * | 12/2004 | Chayes et al. .................... 707/1 |
| 2006/0090095 | A1 | * | 4/2006  | Massa et al. ...................... 714/4 |
| 2008/0256148 | A1 | * | 10/2008 | Kitamura et al. ............. 707/205 |
| 2010/0332564 | A1 | * | 12/2010 | Tantrum ........................ 707/828 |
| 2011/0208940 | A1 | * | 8/2011  | Naganuma et al. ........... 711/170 |
| 2011/0213583 | A1 | * | 9/2011  | Mao et al. ..................... 702/150 |

OTHER PUBLICATIONS

"Handling Network Partitioning (Split-Brain Syndrome)"; printed from Internet website http://code.google.com/p/hazelcast/wiki/NetworkPartitioning, Feb. 17, 2011; Hazelcast, In-Memory Data Grid for Java.

* cited by examiner

*Primary Examiner* — April Y Blair
*Assistant Examiner* — Trang Ta
(74) *Attorney, Agent, or Firm* — Suiter Swantz pc llo

(57) ABSTRACT

A method for merging a source electronic memory storage cluster into a destination electronic memory storage cluster may include designating a source storage cluster having a first configuration; designating a destination storage cluster having a second configuration; receiving a configuration database including mapping information associated with the first configuration of the source storage cluster; merging the configuration database for the source storage cluster into the destination storage cluster; identifying a conflict between the source storage cluster configuration and the destination storage cluster configuration by comparing mapping information for the imported configuration database for the source storage cluster to mapping information for a configuration database associated with the second configuration of the destination storage cluster; resolving the identified conflict between the source storage cluster configuration and the destination storage cluster configuration; and merging the configuration database for the source storage cluster into the destination storage cluster after resolving the identified conflict.

19 Claims, 5 Drawing Sheets

MERGING A STORAGE CLUSTER INTO ANOTHER STORAGE CLUSTER

TECHNICAL FIELD

The present disclosure generally relates to the field of electronic storage, and more particularly to a system and method for merging one electronic memory storage cluster into another electronic memory storage cluster.

BACKGROUND

An electronic storage system may include multiple storage clusters providing block storage services to hosts. For example, an electronic storage system may utilize a Small Computer System Interface (SCSI) Input/Output (I/O) bus to connect multiple storage blocks to one or more host systems. Each storage cluster may have a number of storage controllers acting as cluster nodes, i.e., the controllers may provide hosts with access to Logical Units (LU)/storage devices provisioned via the physical drives connected to the storage controllers. Typically, each controller in a storage cluster may then access each physical drive in the storage cluster. Further, any LU in the cluster may generally be accessible via any controller in the storage cluster.

As storage requirements for a particular installation change over time, it may often be desirable to consolidate some of the storage clusters into a larger, combined storage cluster. In this manner, the total capacity of a storage cluster may be increased. Additionally, it may be desirable to preserve data from the different storage clusters such that it may still be accessible in the new, larger storage cluster. One approach to such a consolidation is to move the controller nodes and the storage devices (physical drives) from one storage cluster (referred to as a source cluster) to another storage cluster (referred to as a destination cluster). This may be described as importing one storage cluster into another storage cluster. Typically, the resulting storage cluster may include the name/Identification (ID) of the destination cluster, while containing the storage controllers (nodes) of both the source and destination clusters, and the associated storage devices.

Typically, two storage clusters are merged by removing one controller/node at a time from a source storage cluster and then adding each node to a destination storage cluster. This process is then repeated until all of the nodes from the source storage cluster have been moved into the destination storage cluster. Further, all of the physical drives associated with the source storage cluster must be moved to the destination storage cluster. However, moving one cluster node at a time may require performing a number of individual management operations, in addition to changing cabling, moving physical drives, and the like. This process may be error prone, time consuming, and may complicate the process of moving data from the source storage cluster to the destination storage cluster. For example, the LU configuration of the source storage cluster may have to be recreated in the destination storage cluster, and the data may have to be reloaded from backup media.

SUMMARY

A method for merging a source electronic memory storage cluster into a destination electronic memory storage cluster may include designating a source storage cluster having a first configuration. The first configuration may include at least one logical identifier mapped to a logical volume of the source storage cluster, where the logical volume is provisioned from at least one physical drive of the source storage cluster, where the logical volume is associated with a first identifier, and where the at least one physical drive is associated with a second identifier. The method may also include designating a destination storage cluster having a second configuration. The method may further include receiving a configuration database including mapping information associated with the first configuration of the source storage cluster. The method may also include merging the configuration database for the source storage cluster into the destination storage cluster. The method may further include identifying a conflict between the source storage cluster configuration and the destination storage cluster configuration by comparing the mapping information for the imported configuration database for the source storage cluster to mapping information for a configuration database associated with the second configuration of the destination storage cluster. The method may also include resolving the identified conflict between the source storage cluster configuration and the destination storage cluster configuration. The method may further include merging the configuration database for the source storage cluster into the destination storage cluster after resolving the identified conflict between the source storage cluster configuration and the destination storage cluster configuration.

A system may include a source storage cluster having a first configuration, where the first configuration includes at least one logical identifier mapped to a logical volume of the source storage cluster, where the logical volume is provisioned from at least one physical drive of the source storage cluster, where the logical volume is associated with a first identifier, and where the at least one physical drive is associated with a second identifier. The system may also include a configuration database including mapping information associated with the first configuration of the source storage cluster. The system may further include a destination storage cluster having a second configuration, where the destination storage cluster is configured for merging the configuration database for the source storage cluster. The system may also include control programming configured for identifying a conflict between the source storage cluster configuration and the destination storage cluster configuration by comparing the mapping information for the imported configuration database for the source storage cluster to mapping information for a configuration database associated with the second configuration of the destination storage cluster, resolving the identified conflict between the source storage cluster configuration and the destination storage cluster configuration, and merging the configuration database for the source storage cluster into the destination storage cluster after resolving the identified conflict between the source storage cluster configuration and the destination storage cluster configuration.

A method for merging a source electronic memory storage cluster into a destination electronic memory storage cluster may include designating a source storage cluster having a first configuration. The first configuration may include at least one logical identifier mapped to a logical volume of the source storage cluster, where the logical volume is provisioned from at least one physical drive of the source storage cluster, where the logical volume is associated with a first identifier, and where the at least one physical drive is associated with a second identifier. The method may also include designating a destination storage cluster having a second configuration. The method may further include receiving a configuration database including mapping information associated with the first configuration of the source storage cluster. The method may also include merging the configuration database for the source storage cluster into the destination storage cluster. The method may further include reporting a conflict between the source storage cluster configuration and the destination storage cluster configuration by comparing the mapping information for the imported configuration database for the source storage cluster to mapping information for a configuration database associated with the second configuration of the destination storage cluster.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1A:
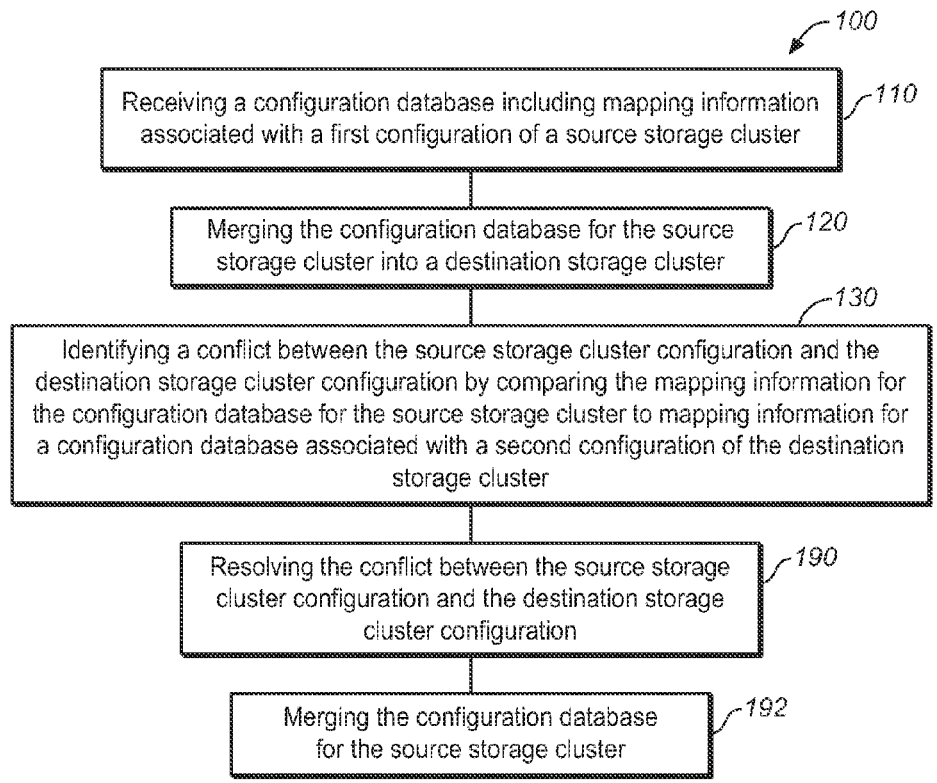
FIG. 1A illustrates an operational flow representing example operations related to merging a source storage cluster into a destination storage cluster.
Figure 1B:
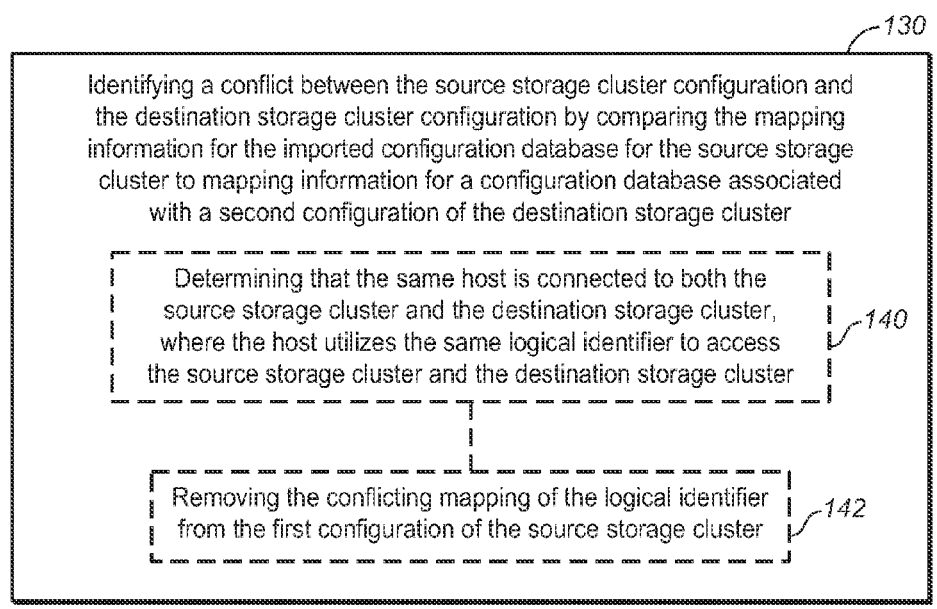
FIGS. 1B through 1F illustrate alternative embodiments of the operational flow of FIG. 1A.
Figure 1C:
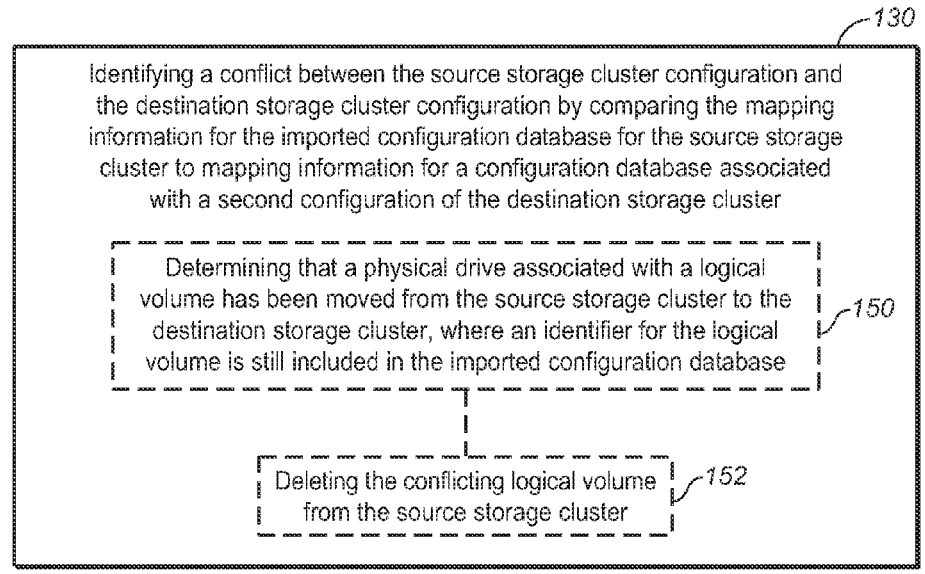
Figure 1D:
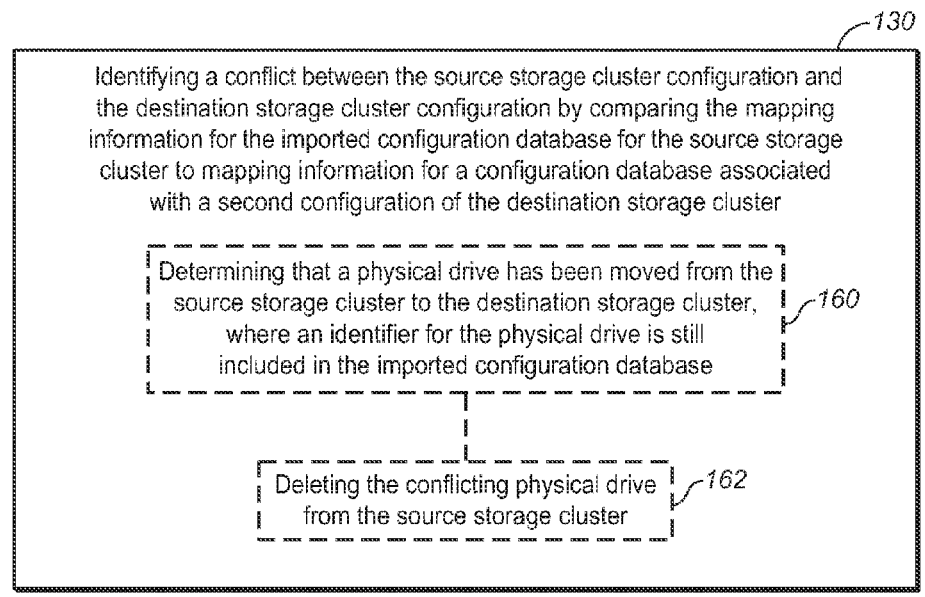
Figure 1E:
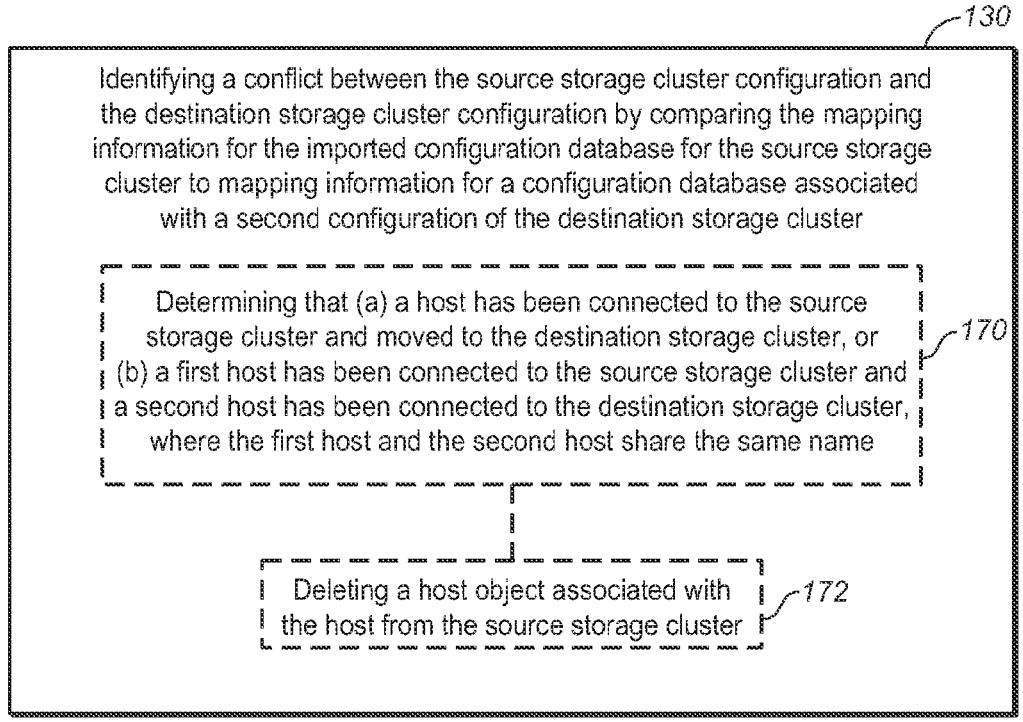
Figure 1F:
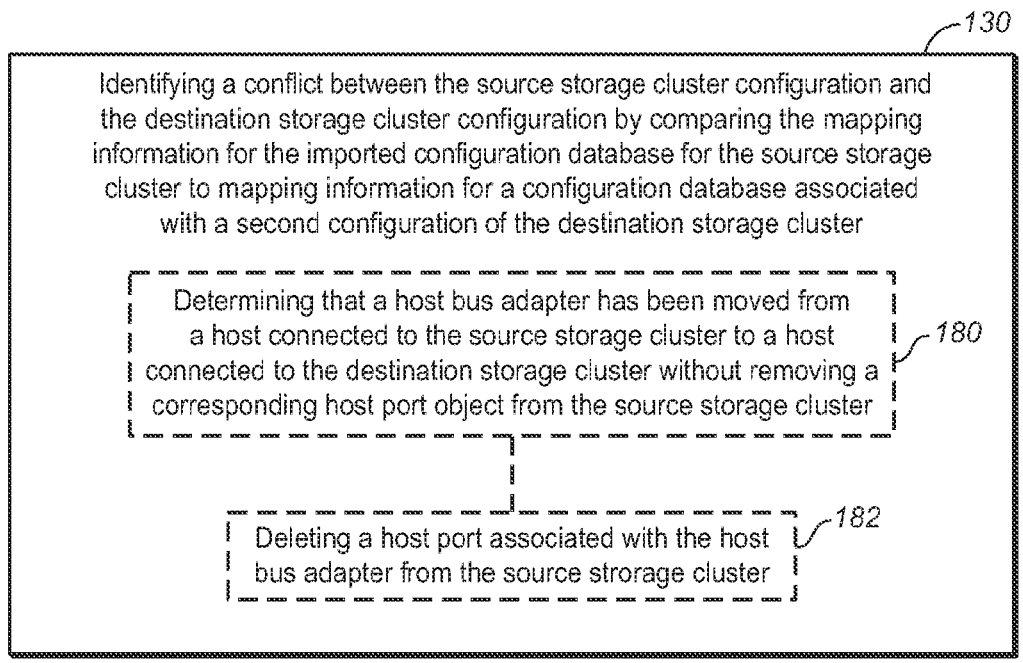
Figure 2:
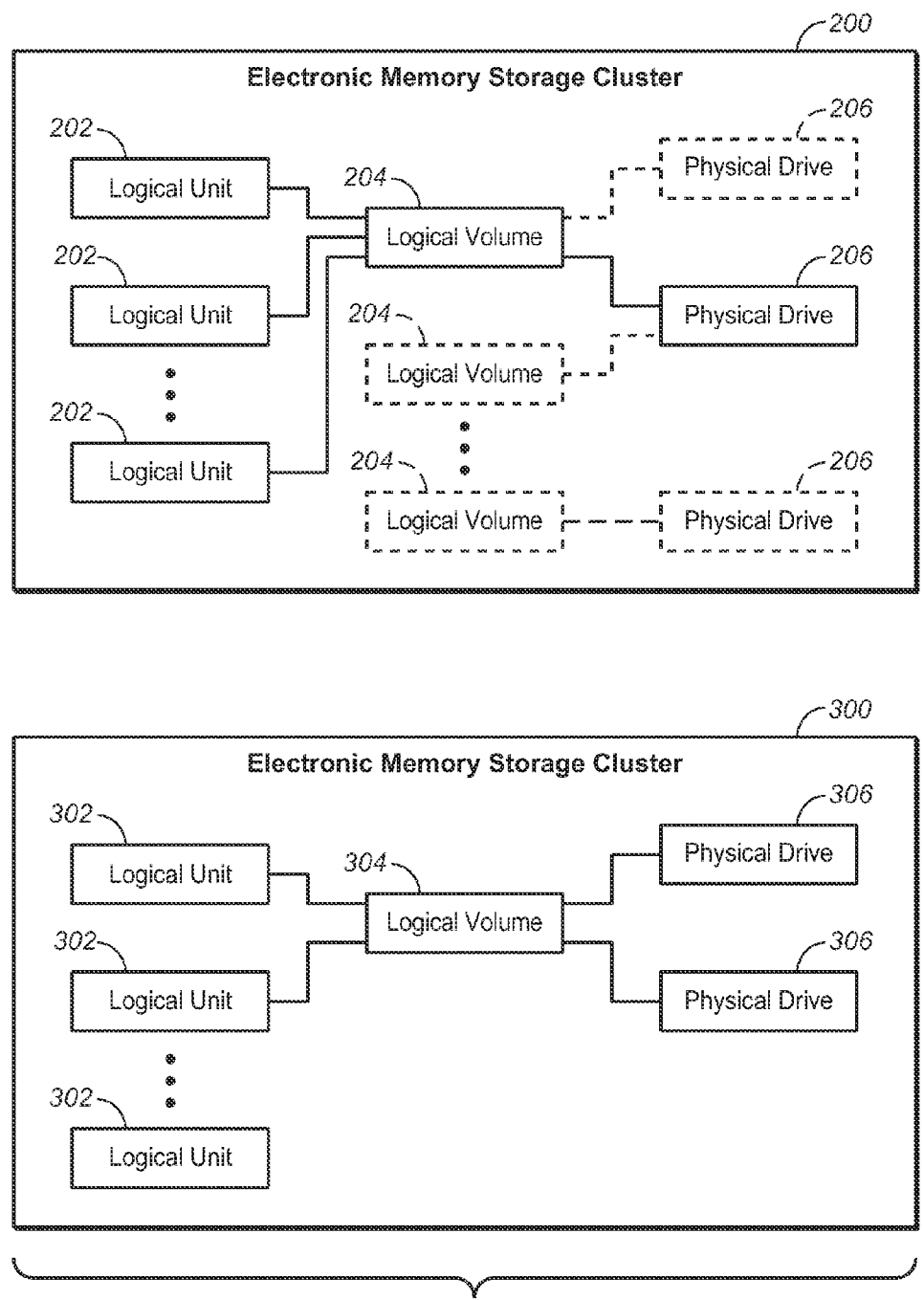
FIG. 2 is a schematic illustrating a source electronic memory storage cluster and a destination electronic memory storage cluster.
Figure 3:
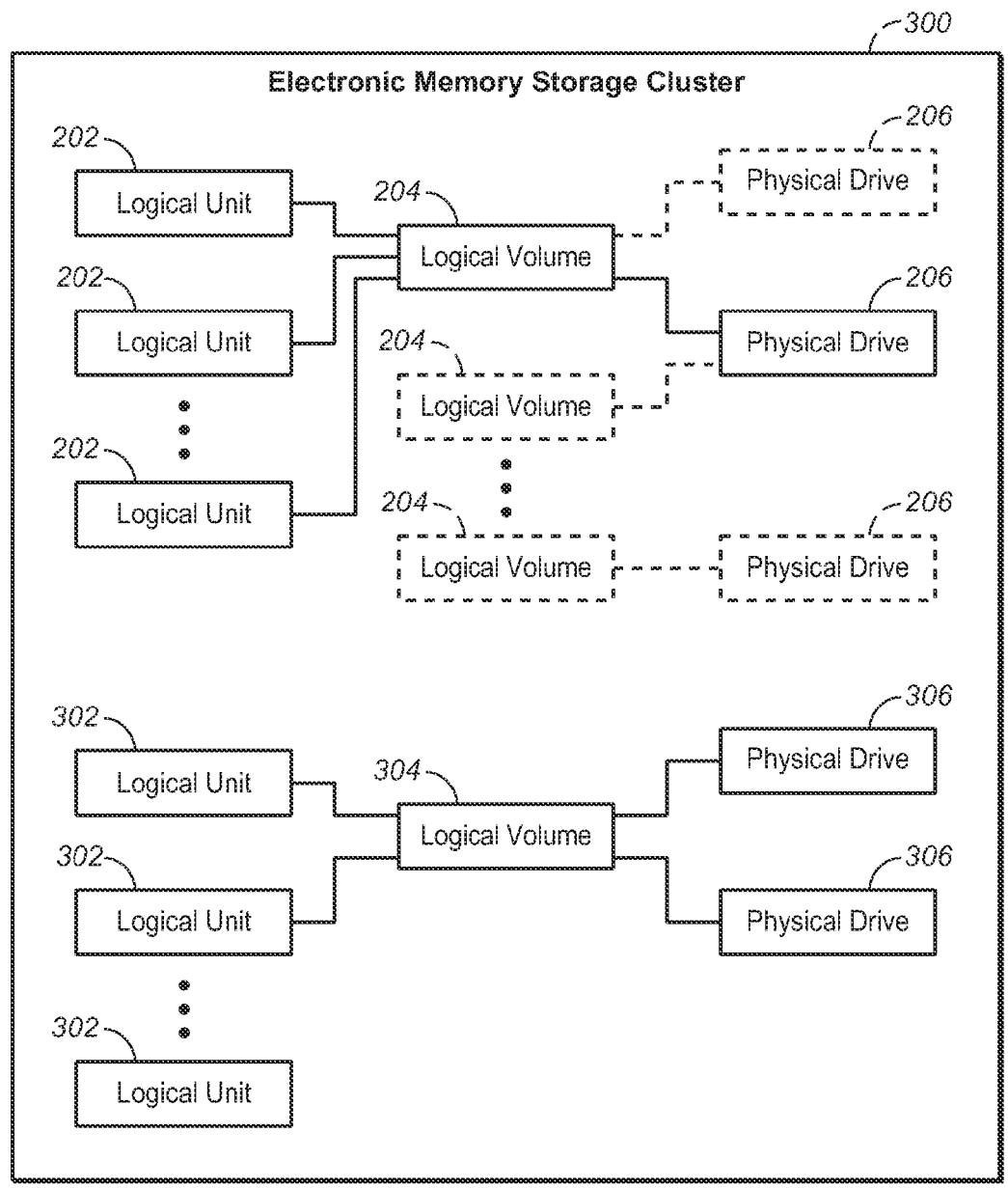
FIG. 3 is a schematic illustrating the source electronic memory storage cluster and the destination electronic memory storage cluster of FIG. 2, where the source storage cluster has been imported into the destination storage cluster.

Referring generally to FIGS. 1A through 3, a method 100 for merging a source electronic memory storage cluster into a destination electronic memory storage cluster is described. In embodiments, one or more of the techniques disclosed herein may be performed as a single management operation such that the resulting storage cluster provides the combined services of both the source and destination storage clusters. Thus, hosts connected to the destination storage cluster will be capable of accessing the Logical Units (LU) of both clusters. In embodiments, method 100 may be utilized with storage systems including, but not limited to, external, internal/Direct-Attached Storage (DAS), RAID, Network-Attached Storage (NAS), and Storage Area Network (SAN) systems and/or networks. However, this list is provided by way of example only, and is not meant to limit the present disclosure. Thus, the methods of the present disclosure may be utilized with other storage systems as well, such as other storage systems implementing block storage schemes.

The method 100 may include designating a source storage cluster having a first configuration. The first configuration may include one or more logical identifiers (e.g., logical unit numbers) mapped to one or more logical volumes of the source storage cluster, where each logical volume is provisioned from one or more physical drives of the source storage cluster. In embodiments, the logical volumes and the physical drives may be associated with unique identifiers. The method 100 may also include designating a destination storage cluster having a second configuration, where the destination storage cluster is logically arranged in the same manner as the first configuration. In embodiments, the storage clusters may also maintain host topology information as part of a configuration, including objects or representations of the hosts that access the storage clusters, as well as host ports utilized by the hosts. It should be noted that hosts are typically identified by their host names, and host ports typically have associated addresses and/or identifiers.

For example, in the case of a storage implementation utilizing a Small Computer System Interface (SCSI) Input/Output (I/O) bus, available storage space in a first/source electronic memory storage cluster 200 and a second/destination electronic memory storage cluster 300 may be logically divided into storage segments referred to as Logical Units (LU), 202 and/or 302. Each LU 202/302 may be accessed via a logical identifier, such as a Logical Unit Number (LUN), or the like, mapping to an underlying storage device, which may be referred to as a volume/logical volume, 204 and/or 304. Each logical volume 204/304 may have an identifier, such as a World Wide Name (WWN), or the like, which uniquely identifies that particular volume.

In embodiments, the logical volumes 204/304 are provisioned from one or more physical drives, 206 and/or 306. For example, in one specific implementation, the logical volumes 204/304 may be provisioned according to a Redundant Array of Independent/Inexpensive Disks (RAID) scheme. Thus, the physical drives 206/306 may form a drive group/pool from which one or more of the logical volumes 204/304 are provisioned. Further, each physical drive 206/306 may have an identifier, such as a WWN, or the like, which uniquely identifies that particular drive.

The method 100 may further include receiving a configuration database including mapping information associated with the first configuration of the source storage cluster, 110. For example, the configuration database may include information about the unique identifiers of the logical volumes 204/304 and/or the physical drives 206/306, as well as the LUNs mapping to the logical volumes 204/304. The configuration database may also include information about host topology. The method 100 may also include merging the configuration database for the source storage cluster into the destination storage cluster, 120. The method 100 may further include identifying a conflict between the source storage cluster configuration and the destination storage cluster configuration by comparing the mapping information for the imported configuration database for the source storage cluster to mapping information for a configuration database associated with the second configuration of the destination storage cluster, 130. In some implementations, the identified conflict may be reported to an operator/administrator of the storage installation. For example, the destination storage cluster may be coupled with a processor (e.g., a processor included with a storage controller, or the like) having control programming for reporting an identified conflict via a user interface (e.g., a graphical user interface implemented through a software program, a web browser, or the like).

The method 100 may also include resolving the identified conflict between the source storage cluster configuration and the destination storage cluster configuration, 190. The method 100 may further include merging the configuration database for the source storage cluster into the destination storage cluster after resolving the identified conflict between the source storage cluster configuration and the destination storage cluster configuration, 192. For example, in some implementations, the destination storage cluster may be coupled with a processor (e.g., as included with a storage controller) having control programming for identifying a conflict between the source and destination cluster configurations, resolving the identified conflict, and then merging the configuration database for the source controller after resolving the conflict. In some instances, this process may be repeated multiple times for multiple conflicts.

In some instances, identifying a conflict between the source storage cluster 200 configuration and the destination storage cluster 300 configuration includes identifying a conflict in one or more logical identifiers/LUNs. In embodiments, this may include determining that the same host is connected to both the source storage cluster and the destination storage cluster, where the host utilizes the same logical identifier to access the source storage cluster and the destination storage cluster, 140. For example, this may include identifying an instance where a host utilizes the same LUN to access two different logical volumes 204/304 in the source storage cluster 200 and the destination storage cluster 300, creating a logical identifier conflict. Once a conflict in one or more logical identifiers/LUNs has been identified, the method 100 may include removing the conflicting mapping of the first logical identifier from the first configuration of the source storage cluster, 142. Then, the cluster import operation may be retried, as illustrated in FIG. 1, step 192.

In some instances, identifying a conflict between the source storage cluster 200 configuration and the destination storage cluster 300 configuration includes identifying a conflict in one or more logical volume identifiers/volume WWNs. In embodiments, this may include determining that one or more physical drives associated with a logical volume (or a set of logical volumes) have been moved from the source storage cluster to the destination storage cluster, where an identifier for the logical volume is still included in the imported configuration database, 150. For example, this may include identifying an instance where a volume WWN associated with a physical drive that was moved to the destination storage cluster may still be in the source storage cluster's configuration database. In this instance, both the source storage cluster 200 and the destination storage cluster 300 may have an occurrence of the same volume WWN. Once a conflict in one or more logical volume identifiers/volume WWNs has been identified, the method 100 may include deleting the conflicting logical volume from the source storage cluster, 152. Then, the cluster import operation may be retried, as illustrated in FIG. 1, step 192.

In some instances, identifying a conflict between the source storage cluster 200 configuration and the destination storage cluster 300 configuration includes identifying a conflict in one or more physical drive identifiers/physical drive WWNs. In embodiments, this may include determining that a physical drive (or a number of physical drives) has been moved from the source storage cluster to the destination storage cluster, where an identifier for the physical drive is still included in the imported configuration database, 160. For example, this may include identifying an instance where a physical drive WWN associated with a physical drive that was moved to the destination storage cluster may still be in the source storage cluster's configuration database. In this instance, both the source storage cluster 200 and the destination storage cluster 300 may have an occurrence of the same physical drive WWN. Once a conflict in one or more physical drive identifiers/physical drive WWNs has been identified, the method 100 may include deleting the conflicting physical drive/drive group from the source storage cluster, 162. Then, the cluster import operation may be retried, as illustrated in FIG. 1, step 192.

In some instances, identifying a conflict between the source storage cluster 200 configuration and the destination storage cluster 300 configuration includes identifying a conflict in one or more host objects. In embodiments, this may include determining that (A) a host has been connected to the source storage cluster and moved to the destination storage cluster, or (B) a first host has been connected to the source storage cluster and a second host has been connected to the destination storage cluster, where the first host and the second host share the same name, 170. In this instance, both the source storage cluster 200 and the destination storage cluster 300 may have an occurrence of the same host object name. Once a conflict in one or more host objects has been identified, the method 100 may include deleting a host object (and its host ports) associated with the host from the source storage cluster, 172. It should be noted that this may remove any LUN mappings the host may have had. Then, the cluster import operation may be retried, as illustrated in FIG. 1, step 192.

In some instances, identifying a conflict between the source storage cluster 200 configuration and the destination storage cluster 300 configuration includes identifying a conflict in one or more host port objects. In embodiments, this may include determining that a Host Bus Adapter (HBA) has been moved from a host connected to the source storage cluster to a host connected to the destination storage cluster without first removing a corresponding host port object from the source storage cluster, 180. In this instance, both the source storage cluster 200 and the destination storage cluster 300 may have a host port with the same address/identifier. Once a conflict in one or more host port objects has been identified, the method 100 may include deleting a host port associated with the HBA from the source storage cluster, 182. Then, the cluster import operation may be retried, as illustrated in FIG. 1, step 192.

After determining the conflict (e.g., as described in method 100, steps 140, 150, 160, 170, and/or 180), a processor/storage controller may report the conflict to an operator/administrator of a storage installation, as previously described. In embodiments, it may be desirable for the operator/administrator of a particular storage installation to manually perform configuration changes that could cause loss of access to data, e.g., removing an LUN mapping. This may help ensure that there is no unexpected loss of data access. As previously described, once conflicts have been resolved, the cluster import operation may proceed. Then, an operator/administrator may be required to physically change cabling in order to add controllers and physical drives of the source cluster to the destination cluster. Once the cabling has been changed so the import operation can complete, all of the physical drives, drive groups, volumes, and host topology of the source cluster may be added to the destination cluster's configuration database.

In implementations, a management interface for the destination cluster may interact with an operator to determine when all of the cabling has been changed. Additionally, the destination cluster may verify that the new cabling is correct by verifying the presence of the controllers and physical drives from the source cluster in the destination cluster. Thus, the volumes of the source cluster will become accessible through all the controllers of the resulting destination cluster. It should be noted that in some instances, an operator may need to add LUN mappings for volumes where conflicts were detected in order to make them accessible again.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for merging a source electronic memory storage cluster into a destination electronic memory storage cluster, the method comprising:
using a computer or processor to perform the steps of:
designating a source storage cluster having a first configuration, where the first configuration includes at least one logical identifier mapped to a logical volume of the source storage cluster, where the logical volume is provisioned from at least one physical drive of the source storage cluster, where the logical volume is associated with a first identifier, and where the at least one physical drive is associated with a second identifier;
designating a destination storage cluster having a second configuration;
receiving a configuration database including mapping information associated with the first configuration of the source storage cluster;
merging the configuration database for the source storage cluster into the destination storage cluster;
identifying a conflict between the source storage cluster configuration and the destination storage cluster configuration by comparing the mapping information for the imported configuration database for the source storage cluster to mapping information for a configuration database associated with the second configuration of the destination storage cluster to determine when a first host has been connected to the source storage cluster and a second host has been connected to the destination storage cluster, where the first host is different from the second host, and where the first host and the second host share the same name;
resolving the identified conflict between the source storage cluster configuration and the destination storage cluster configuration by deleting a host object associated with the first host from the source storage cluster; and
merging the configuration database for the source storage cluster into the destination storage cluster after resolving the identified conflict between the source storage cluster configuration and the destination storage cluster configuration.

2. The method of claim 1, further comprising:
identifying a conflict between the source storage cluster configuration and the destination storage cluster configuration by comparing the mapping information for the imported configuration database for the source storage cluster to mapping information for a configuration database associated with the second configuration of the destination storage cluster to determine when a first host is connected to both the source storage cluster and the destination storage cluster, where the first host utilizes the same logical identifier to access the source storage cluster and the destination storage cluster.

3. The method of claim 2, further comprising:
removing the conflicting mapping of the first logical identifier from the first configuration of the source storage cluster.

4. The method of claim 1, further comprising:
identifying a conflict between the source storage cluster configuration and the destination storage cluster configuration by comparing the mapping information for the imported configuration database for the source storage cluster to mapping information for a configuration database associated with the second configuration of the destination storage cluster to determine when the at least one physical drive associated with the logical volume has been moved from the source storage cluster to the destination storage cluster, where the first identifier for the logical volume is still included in the imported configuration database.

5. The method of claim 4, further comprising:
deleting the conflicting logical volume from the source storage cluster.

6. The method of claim 1, further comprising:
identifying a conflict between the source storage cluster configuration and the destination storage cluster configuration by comparing the mapping information for the imported configuration database for the source storage cluster to mapping information for a configuration database associated with the second configuration of the destination storage cluster to determine when the at least one physical drive has been moved from the source storage cluster to the destination storage cluster, where the second identifier for the at least one physical drive is still included in the imported configuration database.

7. The method of claim 6, further comprising:
deleting the conflicting at least one physical drive from the source storage cluster.

8. The method of claim 1, further comprising:
identifying a conflict between the source storage cluster configuration and the destination storage cluster configuration by comparing the mapping information for the imported configuration database for the source storage cluster to mapping information for a configuration database associated with the second configuration of the destination storage cluster to determine when a Host Bus Adapter (HBA) has been moved from a first host connected to the source storage cluster to a second host connected to the destination storage cluster without removing a corresponding host port object from the source storage cluster.

9. The method of claim 8, further comprising:
deleting a host port associated with the HBA from the source storage cluster.

10. A system, comprising:
a source storage cluster having a first configuration, where the first configuration includes at least one logical identifier mapped to a logical volume of the source storage cluster, where the logical volume is provisioned from at least one physical drive of the source storage cluster, where the logical volume is associated with a first identifier, and where the at least one physical drive is associated with a second identifier;
a configuration database including mapping information associated with the first configuration of the source storage cluster;

a destination storage cluster having a second configuration, where the destination storage cluster is configured for merging the configuration database for the source storage cluster; and control programming configured for identifying a conflict between the source storage cluster configuration and the destination storage cluster configuration by comparing the mapping information for the imported configuration database for the source storage cluster to mapping information for a configuration database associated with the second configuration of the destination storage cluster to determine when a Host Bus Adapter (HBA) has been moved from a first host connected to the source storage cluster to a second host connected to the destination storage cluster without removing a corresponding host port object from the source storage cluster, resolving the identified conflict between the source storage cluster configuration and the destination storage cluster configuration by deleting a host port associated with the HBA from the source storage cluster, and merging the configuration database for the source storage cluster into the destination storage cluster after resolving the identified conflict between the source storage cluster configuration and the destination storage cluster configuration.

11. The system of claim 10, wherein the control programming is further configured for identifying a conflict between the source storage cluster configuration and the destination storage cluster configuration by comparing the mapping information for the imported configuration database for the source storage cluster to mapping information for a configuration database associated with the second configuration of the destination storage cluster to determine when a first host is connected to both the source storage cluster and the destination storage cluster, where the first host utilizes the same logical identifier to access the source storage cluster and the destination storage cluster.

12. The system of claim 11, wherein the control programming is further configured for resolving the identified conflict between the source storage cluster configuration and the destination storage cluster configuration by removing the conflicting mapping of the first logical identifier from the first configuration of the source storage cluster.

13. The system of claim 10, wherein the control programming is further configured for identifying a conflict between the source storage cluster configuration and the destination storage cluster configuration by comparing the mapping information for the imported configuration database for the source storage cluster to mapping information for a configuration database associated with the second configuration of the destination storage cluster to determine when the at least one physical drive associated with the logical volume has been moved from the source storage cluster to the destination storage cluster, where the first identifier for the logical volume is still included in the imported configuration database.

14. The system of claim 13, wherein the control programming is further configured for resolving the identified conflict between the source storage cluster configuration and the destination storage cluster configuration by deleting the conflicting logical volume from the source storage cluster.

15. The system of claim 10, wherein the control programming is further configured for identifying a conflict between the source storage cluster configuration and the destination storage cluster configuration by comparing the mapping information for the imported configuration database for the source storage cluster to mapping information for a configuration database associated with the second configuration of the destination storage cluster to determine when the at least one physical drive has been moved from the source storage cluster to the destination storage cluster, where the second identifier for the at least one physical drive is still included in the imported configuration database.

16. The system of claim 15, wherein the control programming is further configured for resolving the identified conflict between the source storage cluster configuration and the destination storage cluster configuration by deleting the conflicting at least one physical drive from the source storage cluster.

17. The system of claim 10, wherein the control programming is further configured for identifying a conflict between the source storage cluster configuration and the destination storage cluster configuration by comparing the mapping information for the imported configuration database for the source storage cluster to mapping information for a configuration database associated with the second configuration of the destination storage cluster to determine when at least one of (A) a first host has been connected to the source storage cluster and moved to the destination storage cluster, or (B) a first host has been connected to the source storage cluster and a second host has been connected to the destination storage cluster, where the first host and the second host share the same name.

18. The system of claim 17, wherein the control programming is further configured for resolving the identified conflict between the source storage cluster configuration and the destination storage cluster configuration by deleting a host object associated with the first host from the source storage cluster.

19. A method, comprising:
using a computer or processor to perform the steps of:
designating a source storage cluster having a first configuration, where the first configuration includes at least one logical identifier mapped to a logical volume of the source storage cluster, where the logical volume is provisioned from at least one physical drive of the source storage cluster, where the logical volume is associated with a first identifier, and where the at least one physical drive is associated with a second identifier;
designating a destination storage cluster having a second configuration;
receiving a configuration database including mapping information associated with the first configuration of the source storage cluster;
merging the configuration database for the source storage cluster into the destination storage cluster;
reporting a conflict between the source storage cluster configuration and the destination storage cluster configuration identified by comparing the mapping information for the imported configuration database for the source storage cluster to mapping information for a configuration database associated with the second configuration of the destination storage cluster to determine when at least one of (A) a first host has been connected to the source storage cluster and a second host has been connected to the destination storage cluster, where the first host is different from the second host, and where the first host and the second host share the same name, or (B) a Host Bus Adapter (HBA) has been moved from a first host connected to the source storage cluster to a second host connected to the destination storage cluster without removing a corresponding host port object from the source storage cluster.

* * * * *